United States Patent

[11] 3,545,408

| [72] | Inventor | John M. Wert |
| | | Goshen, Indiana |
| [21] | Appl. No. | 759,605 |
| [22] | Filed | Sept. 13, 1968 |
| [45] | Patented | Dec. 8, 1970 |
| [73] | Assignee | Chore-Time Equipment, Inc. |
| | | Milford, Indiana |
| | | a corporation of Indiana |

[54] CONTROLLED ANIMAL FEEDER APPARATUS
13 Claims, 5 Drawing Figs.
[52] U.S. Cl. .................................................... 119/51.11,
119/56
[51] Int. Cl. ...................................................... A01k 39/00
[50] Field of Search........................................... 119/51, 52,
56, 53, 51.11; 198/66; 222/76, 70

[56] References Cited
UNITED STATES PATENTS
3,144,173  8/1964  France et al. .................. 222/76

| 3,225,742 | 12/1965 | Hagans........................ | 119/51.11 |
| 3,325,055 | 6/1967 | Marshall...................... | 119/56X |
| 3,330,255 | 7/1967 | Scott et al.................... | 119/51.11 |
| 3,415,228 | 12/1968 | Myers.......................... | 119/51.11 |

*Primary Examiner*—Aldrich F. Medbery
*Attorney*—Olson, Trexler, Wolters & Bushnell

ABSTRACT: There is disclosed an apparatus for feeding animals such as poultry controlled amounts of feed at predetermined time intervals. The apparatus has an elongated conduit including a feed conveying portion and feed storage portions and a plurality of feeding trays suspended beneath apertures in a lower side of the conduit. An auger is operated within the conduit for advancing feed along the conveying portion and a second auger is operated within the lower storage portions for dispensing predetermined quantities of feed from the storage portions into the pans.

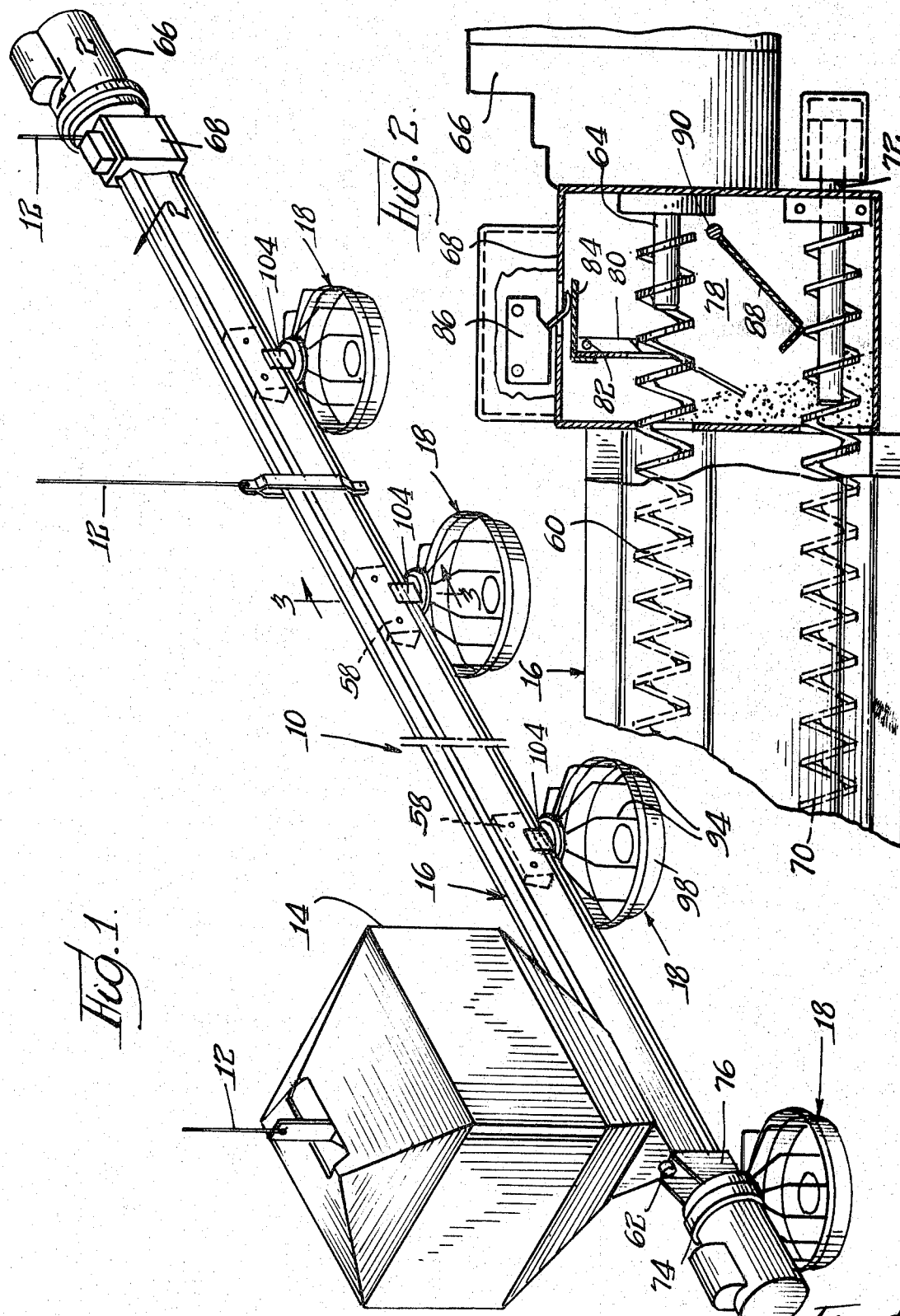

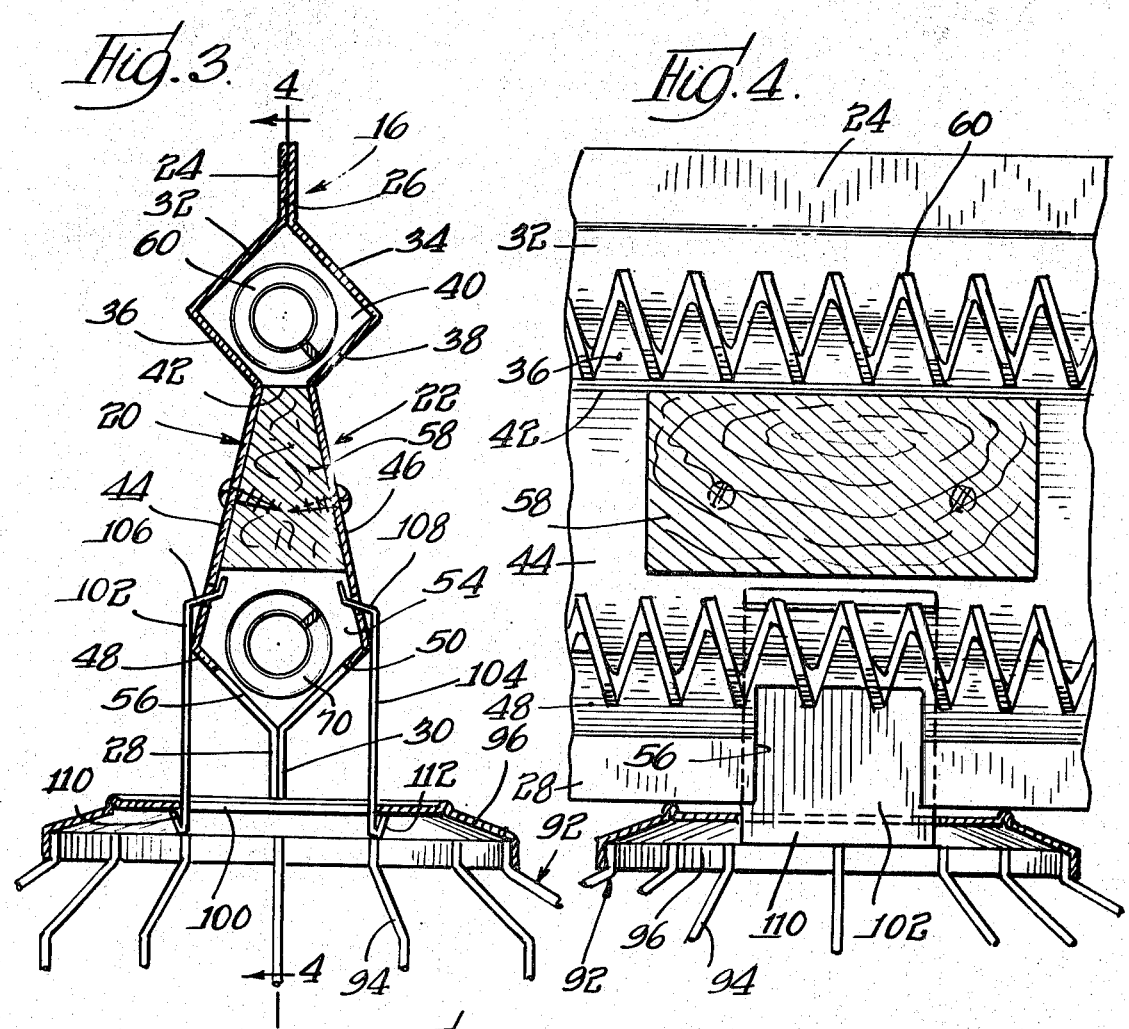

CONTROLLED ANIMAL FEEDER APPARATUS

The present invention relates to a novel animal feeding apparatus, and more specifically to a novel apparatus for automatically supplying controlled amounts of feed to the animals.

While features of the present invention may be utilized in apparatus for feeding various types of animals, one embodiment is especially suitable for feeding poultry. It has been found that a number of benefits can be obtained by controlling and restricting the amount of feed eaten by certain birds such as growing pullets and heavy breeder hens. The economic benefits which may include reduced body fat, increased livability, greater uniformity of birds, better rate of egg-laying and greater percentage of hatchability can be very significant. Thus, many efforts have been made to devise the best procedure for controlling and restricting the amount of feed supplied.

Attempts have been made to use presently available automatic poultry feeding equipment to supply restricted amounts of feed. These attempts have generally resulted in the practice of feeding the birds every other day since if an attempt is made to supply a limited quantity of feed on a daily basis with presently current commercially available automatic equipment, the birds closest to the hopper end of the feeder usually have an opportunity to obtain an excessive amount of feed while the birds farthest from the hopper may not receive enough. While the skip-a-day feeding program has obtained some of the advantages of restricted feeding, the fact that the birds must go one day without feed causes some stresses in the birds which may impair their health or functioning.

It is an important object of the present invention to provide a novel apparatus especially suitable for supplying controlled or predetermined increments of feed at any desired predetermined time interval and in a manner such that all animals being fed have substantially the same opportunity to obtain the feed.

A further specific object of the present invention is to provide a novel animal or poultry feeder having an elongated conduit with upper and lower portions and a plurality of feed dispensing assemblies or pans supported beneath spaced discharge openings in said lower portion, conveying means operating in said upper portion for directing feed the length of the conduit and filling the lower portion thereof, and additional conveying means in the lower portion of the conduit and operable for discharging increments of the feed from the lower portion through said openings and into the dispensing assemblies or pans.

Other objects and advantages of the present invention will become apparent from the following description and the accompanying drawings wherein:

FIG. 1 is a perspective view showing a feeder apparatus incorporating features of the present invention;

FIG. 2 is an enlarged partial sectional view take generally along line 2—2 in FIG. 1;

FIG. 3 is an enlarged fragmentary sectional view taken along line 3—3 in FIG. 1;

FIG. 4 is a fragmentary sectional view taken along line 4—4 in FIG. 3; and

FIG. 5 is a schematic view of an electrical control circuit included in the apparatus of the invention.

Referring now more specifically to the drawings wherein like parts are designated by the same numerals throughout the various FIGS., an apparatus 10 incorporating features of the present invention is shown in FIG. 1. As will be understood, the apparatus is adapted to be installed in an animal or poultry house so as to extend more or less the length thereof. For example, the apparatus may have any desired overall length up to at least several hundred feet. Means including cables or chains 12, overhead pulleys and the like, not shown, are provided for suspending the apparatus at the desired level above the floor of the poultry house.

The apparatus 10 comprises a hopper 14 which may be manually or automatically filled with the desired feed. The hopper is connected to and has a discharge opening at the bottom thereof communicating with one end portion of an elongated conduit 16 which will be described more in detail below. Connected to and depending from the conduit 16 are food dispensing or feed pan assemblies 18 located at spaced intervals.

As shown best in FIG. 3, the conduit 16 is formed from two complementary or opposite side sections 20 and 22. These sections are formed with abutting upper marginal flanges 24 and 26 which are welded or otherwise secured together and abutting lower marginal flanges 28 and 30 which are also welded or otherwise secured together. Sections 32 and 34 of the opposite side members diverge from their respective junctions with flanges 24 and 26 and integrally join converging sections 36 and 38. These sections are arranged so as to provide the conduit 16 with an upper tubular portion 40 through which feed is conveyed as described below.

Lower margins of the sections 36 and 38 are spaced from each other so as to provide a throat 42 therebetween. These margins are joined with additional diverging sections 44 and 46 which in turn merge with converging sections 48 and 50 respectively having lower margins joining the lower flanges 28 and 30. The diverging sections 44 and 46 preferably have a width or vertical dimension substantially greater than the corresponding dimension of the diverging sections 32 and 34 so that the lower diverging sections 44 and 46 combine with the sections 48 and 50 in providing the conduit with a lower chamber portion 54 having a volume substantially greater than the volume of the upper portion 40.

Discharge or feed dispensing openings 56 are provided at spaced intervals in the lower conduit sections 48 and 50 as shown in FIGS. 3 and 4. These openings are centrally disposed above the pan assemblies 18 and, as indicated in FIG. 4, have a length axially of the conduit which is relatively short as compared with the diameter of the pan assemblies.

Blocks 58 are mounted at spaced intervals between the sections 44 and 46 as shown in FIGS. 1, 3 and 4. These blocks are respectively located above the discharge openings 56 and project axially of the conduit beyond opposite ends of their associated discharge openings. The blocks 58 serve not only as spacers between the side sections 44, 46 of the conduit which may be formed from relatively thin sheet material such as metal, but also to close the throat 42 between the upper and lower chamber portions 40 and 54 of the conduit. In other words, the members 58 serve to prevent feed from falling directly from the upper portion 40 of the conduit through the discharge openings 56 and into the pan assemblies.

Means is provided in the conduit 16 for conveying feed from the hopper 14 throughout the length of the conduit. This means comprises an open center helical auger 60 formed from a strip of spring steel wire and disposed throughout the length of the upper conduit portion 40. One end of the auger 60 is secured to anchor and bearing means 62 located at the hopper or upstream end of the conduit as indicated in FIG. 1. An opposite end of the auger is fixed to an output drive shaft 64 of a combined motor and speed-reducing unit 66 mounted on a housing 68 secured to the opposite or downstream end of the conduit 16 as shown in FIG. 2.

Another similar auger 70 is disposed in the lower portion 54 of the conduit. This auger has one end secured to an anchor and bearing unit 72 mounted on the housing 68 and an opposite end secured to an output drive shaft, not shown, of a motor and speed-reducing unit 74 identical to the unit 66 but located on a bracket 76 secured to the hopper or upstream end of the conduit 16.

The housing 68 provides a chamber 78 into which feed is adapted to be directed by the auger 60. A paddle 80 is mounted on pivot means 82 in the chamber and is adapted to be actuated by the pressure of feed filling the chamber so as to cause a lever portion 84 thereof to actuate a switch 86 which serves to control the motor unit 66 as described below.

An agitator 88 is also disposed in the chamber 78 for preventing feed from being packed therein. In the embodiment shown, the agitator is in the form of a lever pivotally mounted as at 90 and adapted to be engaged by and vibrated by the auger 70.

Each of the dispensing or pan assemblies 18 comprises a grill 92 which includes a number of generally radially and downwardly extending wire spokes 94 having upper ends secured to a sheet metal top member 96. Lower ends of the spokes are preferably detachably connected to a pan 98.

Each grill top member 96 is provided with an opening 100 in alignment with and preferably larger than the discharge opening 56 with which the pan assembly is associated. Hanger elements 102 and 104 have upper end portions 106 and 108 hooked into suitable slots formed in the side sections 44 and 46 and lower reversely bent ends 110 and 112 hooked beneath the inner margins of each top member 96 for detachably suspending the pan assemblies beneath the conduit.

A simplified wiring diagram which may be utilized in the apparatus of the present invention is shown in FIG. 5. More specifically, the motor unit 66 is connected with a suitable source of electrical energy by wires 114, 116 and 118 and wires 120, 122 and 124. The previously mentioned switch 86 is connected in the wire 114. This switch and the actuating paddle 80 therefor are constructed so that the switch is normally closed when there is little or no feed in the chamber 78 and the switch is closed when the chamber is filled.

The motor 78 is connected with the source of electrical energy through wires 125 and 127 connected with a relay 126. This relay has terminals connected with the previously mentioned wires 116 and 122 and is adapted to be energized and controlled by a time delay relay 128 of known construction. The time delay relay is in turn connected with and controlled by a timeclock 130 also of known construction. The arrangement is such that the timeclock may be set to close the control circuit to initiate a feeding cycle at any interval an operator may desire during a 24 hour period. When the control circuit is energized, the time delay relay causes the relay 126 to close for a predetermined length of time. The time delay relay may be adjusted so that this length of time may be varied in accordance with the amount of food which it is desired to deposit in the feed pan assemblies during each feeding cycle. Thus, the amount of feed deposited in each pan during each feeding cycle may be varied from a very small quantity which might, by way of example only, be 2 or 3 ounces to a relatively large quantity such as 2 or 3 pounds.

The apparatus previously described is adapted to be operated in the following manner. The timeclock is first set in accordance with the number of feeding cycles which is desired during each 24 hour period and the time delay relay is also set in accordance with the desired amount of feed to be deposited during each cycle. In addition, the main hopper 14 is filled with feed. Then, upon energizing of the circuit shown in FIG. 5 the motor unit 66 will operate to drive the auger 60 since the chamber 78 is initially empty and the switch 86 is initially closed.

As the auger 60 rotates, feed is conveyed longitudinally of the upper portion 40 of the conduit 16. As the feed travels along the upper portion 40, it falls through the throat 42 so as progressively to fill the lower portion or chamber 54 along the length of the conduit.

As the lower portions of the conduit between the block 58 become filled, the feed continues to travel the length of the conduit until it enters and fills the chamber 78 sufficiently to actuate the paddle 80 and open the switch 86. Then at a predetermined time set by the clock 130, the time delay relay 128 is energized for operating the motor 74 for a predetermined short interval. Operation of this motor causes rotation of the auger 70 which functions to convey the feed in a direction opposite to the direction of movement caused by the auger 60. Thus, increments of the feed in the lower portion 54 of the conduit will be discharged through the openings 56 and into the pan assemblies. As previously indicated, the amount of these increments is determined by the length of time which the motor 74 is actuated and this, of course, is determined by the setting of the time delay relay 128.

When the auger 70 is initially operated, the lower portion 54 of the conduit and the chamber 78 are substantially full. It is contemplated that any single operation of the motor 74 will usually be so short that only a relatively small part of the feed stored in the lower conduit chamber 54 between the blocks 58 and in the chamber 78 will be removed and discharged into the pan assemblies. Thus, several cycles of the motor 74 may occur before sufficient feed is removed from the chamber 78 to release the paddle 80 and permit closing of the switch 86. Of course, when the switch 86 closes, the motor 66 is immediately energized for actuating the auger 60 for refilling not only the chamber 78, but also the entire length of the chamber 54 in the conduit. Thus, while the motor 66 operates in accordance with demand sensed by the switch 86, the auger 70 operates in a controlled manner at predetermined time intervals and for predetermined lengths of time so as to dispense measured quantities of feed during each cycle. Furthermore, the auger 60 functions so as to maintain sufficient feed in all parts of the conduit chamber 54 at all times so that whenever the auger 70 is operated, feed is discharged simultaneously into all of the pan assemblies 18 along the entire length of the feeder.

While a preferred embodiment of the present invention has been shown and described herein, it is obvious that many structural details may be changed without departing from the spirit and scope of the appended claims.

I claim:

1. An animal feeder apparatus comprising means for conveying feed along a path of travel to and past a plurality of spaced-apart feeding stations, chamber means including a plurality of spaced portions adjacent each of said feeding stations and disposed for receiving a quantity of feed from said conveying means, said chamber means including a plurality of discharge openings respectively offset from but adjacent to each of said portions and located substantially at said stations, means for intermittently conveying feed from said portions to said discharge openings and for discharging the feed through said openings at each of said stations in substantially predetermined increments, and means for actuating said first-mentioned conveying means for maintaining a quantity of feed in said chamber means which is at least substantially equal to said increments.

2. An apparatus, as defined in claim 1, which includes dispensing pan assemblies respectively located at said feeding stations and connected with said chamber means for receiving the increments of feed discharged from said chamber means.

3. An apparatus, as defined in claim 1, wherein said means for intermittently discharging feed comprises time responsive means for actuating said discharging means at predetermined intervals and for substantially predetermined lengths of time at each such interval.

4. An apparatus, as defined in claim 1, wherein said first-mentioned conveying means comprises conduit means having a tubular portion above said chamber means, said tubular portion having a longitudinally extending opening in the lower side thereof substantially throughout the length thereof for permitting feed to fall from the tubular portion into said chamber means.

5. An apparatus, as defined in claim 4, wherein said conduit means tubular portion and said chamber means are integral.

6. An apparatus, as defined in claim 5, wherein said chamber means discharge openings are in a lower side thereof, said apparatus including means blocking the opening in the lower side of said tubular portion at spaced locations in alignment with said discharge openings for preventing substantial flow of feed directly from said tubular portion through said discharge openings.

7. An animal feeder apparatus comprising means for conveying feed along a path of travel to and past a plurality of spaced-apart feeding stations, chamber means adjacent each of said feeding stations and disposed for receiving a quantity of feed from said conveying means, said conveying means including conduit means having a tubular portion above said chamber means with a longitudinally extending opening in a lower side thereof substantially throughout the length thereof for permitting feed to fall from the tubular portion to the chamber means, said chamber means including spaced discharge openings in a lower side thereof substantially at said feeding stations, means blocking the opening in the lower side of said tubular portion at spaced locations in alignment with said discharge openings for preventing substantial flow of feed directly from the tubular portion through said discharge openings, means for intermittently discharging increments of feed from said chamber means through said discharge openings, said conveying means including an auger mounted in said tubular portion for conveying feed generally axially in one direction and said means for discharging increments of feed comprising an auger disposed in said chamber means for conveying feed generally axially in an opposite direction.

8. In an apparatus of the type described, elongated feed conduit means including a tubular upper portion having a longitudinally extending opening means in a lower side thereof and extending for substantially the full length thereof, and a lower chamber portion in communication with said upper portion through said opening means, means defining discharge openings in said chamber means at spaced intervals, said chamber means having closed bottom portions between said discharge openings, and means within the conduit means above and in general alignment with said discharge openings for obstructing the flow of feed directly from said tubular portion through said discharge openings.

9. In a feeder apparatus of the type described, conduit means including a tubular upper portion and having longitudinally extending opening means in a lower side thereof and a lower chamber portion in communication with said upper portion through said opening means, means defining discharge openings in said chamber means at spaced intervals, means within said conduit means obstructing the flow of feed directly from said tubular portion through said discharge openings, an elongated conveyor element disposed in said tubular portion for conveying feed axially of said tubular portion in one direction, such feed progressively falling through the elongated opening means and progressively filling the chamber portion between said discharge openings, a second elongated conveyor element disposed in said chamber portion for conveying feed therefrom through said discharge openings.

10. An apparatus, as defined in claim 9, wherein both of said conveyor elements comprise elongated augers, a first motor unit mounted at one end of said conduit means and drivingly connected with the first-mentioned conveyor element, and a second motor unit mounted at an opposite end of said conduit means and drivingly connected with said second conveyor element.

11. A feeder apparatus, as defined in claim 10, which includes switch means adjacent said first end of the conduit means and responsive to feed filling said chamber means for controlling operation of said first motor unit, and time responsive means connected with said second motor unit for actuating the second motor unit at predetermined time intervals and for a predetermined length of time at each interval.

12. An apparatus, as defined in claim 11, which includes dispensing pan assemblies connected to and suspended from said conduit means beneath and in alignment with said discharge openings.

13. An apparatus, as defined in claim 12, wherein said first conveyor element moves feed in one direction and said second conveyor element moves feed in an opposite direction.